United States Patent
Wolf et al.

(10) Patent No.: US 7,826,040 B2
(45) Date of Patent: Nov. 2, 2010

(54) ELECTRO-OPTICAL MEASURING DEVICE

(75) Inventors: Peter Wolf, Leinfelden-Echterdingen (DE); Uwe Skultety-Betz, Leinfelden-Echterdingen (DE); Gunter Flinspach, Leonberg (DE); Clemens Schulte, Stuttgart (DE); Joerg Stierle, Waldenbuch (DE); Cedric Pahud, Morges (CH); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/066,341

(22) PCT Filed: Jul. 25, 2006

(86) PCT No.: PCT/EP2006/064620

§ 371 (c)(1),
(2), (4) Date: Jun. 13, 2008

(87) PCT Pub. No.: WO2007/031359

PCT Pub. Date: Mar. 22, 2007

(65) Prior Publication Data

US 2008/0266544 A1    Oct. 30, 2008

(30) Foreign Application Priority Data

Sep. 13, 2005    (DE) ................. 10 2005 043 418

(51) Int. Cl.
*G01C 3/08* (2006.01)

(52) U.S. Cl. .............. 356/4.01; 356/4.02; 356/4.1; 356/5.01; 356/5.1; 356/5.15

(58) Field of Classification Search ........ 356/3.01–28.5
See application file for complete search history.

(56) References Cited

U.S. PATENT DOCUMENTS

| 4,733,937 | A | * | 3/1988 | Lia et al. ................ 385/117 |
| 5,142,416 | A | | 8/1992 | Nakamura et al. |
| 5,347,137 | A | | 9/1994 | Street |
| 5,541,678 | A | * | 7/1996 | Awanohara et al. ......... 351/161 |
| 5,815,251 | A | | 9/1998 | Ehbets et al. |
| 6,281,968 | B1 | | 8/2001 | Seifert et al. |
| 6,369,880 | B1 | | 4/2002 | Steinlechner |

(Continued)

FOREIGN PATENT DOCUMENTS

DE    43 16 348    11/1994

(Continued)

*Primary Examiner*—Thomas H Tarcza
*Assistant Examiner*—Luke D Ratcliffe
(74) *Attorney, Agent, or Firm*—Michael J. Striker

(57) ABSTRACT

The invention relates to an electro-optical measuring device, in particular a hand-held device (10) for contactless distance measurement, comprising an optical transmission path (28), which has a first optical axis (72) and which has at least one optical transmitter (20) for emitting a measurement signal, and also comprising a reception path (29) having a second optical axis (74), which is spaced apart from the first optical axis (72), with at least one reception optic (32) for focusing a measurement signal in the direction of a receiver (26), and also comprising an optical near range element (60) for parallax compensation. It is proposed that the near range element (60) be embodied rotationally symmetrically with respect to the second optical axis (74).

16 Claims, 4 Drawing Sheets

U.S. PATENT DOCUMENTS

| | | | |
|---|---|---|---|
| 2004/0012770 A1* | 1/2004 | Stierle et al. | 356/4.01 |
| 2005/0036129 A1* | 2/2005 | Watanabe | 356/4.01 |
| 2007/0091293 A1* | 4/2007 | Okuno et al. | 356/3.01 |
| 2008/0007711 A1* | 1/2008 | Liu | 356/5.11 |

FOREIGN PATENT DOCUMENTS

| | | |
|---|---|---|
| DE | 198 04 059 | 8/1999 |
| DE | 198 60 464 | 7/2000 |
| DE | 102 54 888 | 6/2004 |
| EP | 0 384 353 | 8/1990 |
| EP | 1 054 267 | 11/2000 |
| GB | 2 333 920 | 8/1999 |
| JP | 9-21874 | 1/1997 |
| WO | 92/05455 | 4/1992 |
| WO | 00/33104 | 6/2000 |

* cited by examiner

ELECTRO-OPTICAL MEASURING DEVICE

CROSS-REFERENCE

The invention described and claimed hereinbelow is also described in PCT/EP 2006/064620, filed on Jul. 25, 2006 and DE 102005043418.5, filed Sep. 13, 2005. German Patent Application, whose subject matter is incorporated here by reference, provides the basis for a claim of priority of invention under 35 U.S.C.119 (a)-(d).

The present invention is directed to an electro-optical measuring device.

BACKGROUND OF THE INVENTION

Electro-optical measuring devices with a bi-axial system of transmission and reception path are used, e.g., as contactless distance measuring devices, and they have been commercially available as such for quite some time. These devices emit a modulated measurement signal via a transmission path. The modulated measurement signal is reflected and/or scattered on the surface of a target object whose distance from the device is to be determined. A portion of the reflected or scattered measurement radiation returns to the measuring device, where it is detected by a receiver unit.

The distance of the target object from the measuring device may be deduced from the transit time of the measurement signal and/or from the phase shift between the transmitted measurement signal and the detected, returning measurement signal, which is correlated with the transit time.

Bi-axial measuring systems, with which the transmission path is located a distance away from the reception path, have the advantage that a complex radiation-splitting system is not required to select the returning measurement signal, thereby enabling, e.g., optical crosstalk from the transmission path directly into the reception path to be suppressed to a greater extent.

Bi-axial measuring devices also require measures to compensate for the parallax between the transmission path and the reception path.

Although the depiction of the target object on the detector surface of the receiver is clearly located on the receiver even when the target distances are great, the image moves increasingly further away from the optical axis of the reception path as the measurement distance decreases, and the beam cross-section varies in the receiver plane.

As a result, the measurement signal may approach zero in the short range of detection, i.e., when the distance between a desired target object and the measuring device is short, if no further measures are taken in the device.

Various measures for parallax compensation of bi-axial measuring systems are known from the related art, some of which are based on the design of the receiver, and others of which are based on the design of the receiving lens system.

Publication DE 43 16 348 A1 makes known a device for distance measurement with a visible measurement beam created using a semiconductor laser, the reception device of which includes an optical waveguide with a downstream opto-electronic converter. The light input surface into the fibers of the optical waveguide is located in the plane of projection of the receiving lens of this device for large object distances, and it is displaceable out of this position, transversely to the optical axis. In this manner, the device described in DE 43 16 348 A1 makes it possible to direct the measurement beams—that strike the receiving lens at increasingly greater slants as the object distances decrease—to the photosensitive surface of the detector by adjusting the optical fibers, if it is not possible to change the position of the detector.

As an alternative, to solve the parallax problem associated with bi-axial measuring devices, publication DE 43 16 348 A1 provides that the optical waveguide input surface is fixed in position, and that the imaging position of the measurement beam is deflected to the optical axis of the receiving lens using optical deflection means when shorter object distances are involved.

To this end, publication DE 43 16 348 A1 provides that prisms or diffractive optical elements are used, which are located near the receiving lens.

Publication DE 198 60 464 A1 makes known a laser rangefinder for large measuring ranges with parallel transmission and reception channels, in which case the receiving lens is a modified lens element composed of a primary lens region with a primary optical reception axis that is oriented parallel to the optical transmission axis, and with a secondary lens region with a secondary optical reception axis, which is tilted by an angle $\alpha$ relative to the primary optical reception axis, thereby resulting in a primary focal point and a secondary focal point.

Publication WO 92/05455 makes known a coaxial, optical distance measuring device, the receiving lens system of which include zone-type elements having different focal distances. Using this special receiving lens system, light from different object distances is focussed on the receiver in an optimal manner by the assigned zonal element of the imaging lens system.

SUMMARY OF THE INVENTION

The inventive electro-optical measuring device includes a transmission path with at least one optical transmitter for transmitting a measurement signal, and a reception path with at least one receiving lens system for focussing a measurement signal in the direction of a receiver. The optical axes of the transmission path and reception path are separated. As such, the inventive electro-optical measuring device is a bi-axial system. For the parallax compensation of this bi-axial, optical system, the inventive electro-optical measuring device also includes an optical short-range element.

The short-range element for parallax compensation is advantageously designed to be rotationally symmetrical with the optical axis of the reception path.

An electro-optical measuring device, e.g., a contactless distance measuring device designed as a bi-axial system, is typically optimized for a certain measuring range, i.e., a certain distance range. From this optimal distance range, the measurement signal—which is, e.g., reflected or scattered on a target object—is focussed in an optimal manner by the imaging lens system of the measuring device and is focused on the receiver of the measuring device. The receiver of the measuring device is typically separated from the receiving lens system by the focal distance of the receiving lens system, so that a measurement signal that appears to come from infinity may be focussed effectively onto the receiver. Although the imaging of the target object on the receiver surface of the measurement receiver integrated in the device is therefore still located unambiguously on the receiver when the target distances are great, the measurement signal moves increasingly further away from the optical axis of the receiving path as the measurement distance decreases. As a result, for special, short distances between the measuring device and the target object, there is a risk that the measurement signal may approach zero in the short detection range, i.e., when the distance between a target object and the measuring device is small.

The inventive short-range element ensures that a sufficient amount of light also strikes the measurement receiver in the range of short measurement distances. The short-range element is advantageously designed to be rotationally symmetrical with the optical axis of the reception path.

This makes it possible, advantageously, to realize a short-range element for parallax compensation of electro-optical measuring devices in a simple and, therefore, cost-favorable manner.

Compared with the short-range elements known from the related art, the short-range element of the inventive device has the advantage that effective parallax compensation may be attained using a relatively simple lens and a standard receiver.

The short-range element of the inventive measuring device is advantageously designed to be concentric with the receiving lens system. In a particularly advantageous embodiment, the short-range element may also be designed as one piece with the receiving lens system.

In an advantageous embodiment, the receiving lens system and the short-range element form a rotationally symmetrical—in particular, circumferentially symmetrical—multifocal lens, the rotationally symmetrical, short-range portion of which results in effective parallax compensation for short object distances.

The multifocal lens advantageously includes a first region that has an aspherical surface curvature. Due to its aspherical surface curvature, this first region of the multifocal lens, which performs the task of a typical receiving lens system, results in very good bundling and focussing of the measurement signal on the receiver when object distances are great.

In a first embodiment of the inventive measuring device, the multifocal lens includes a second region, which has a continually changing surface curvature and is used as a short-range element. Due to the continually changing surface curvature of the second region of the multifocal lens, this region does not have a defined focal distance. Instead, it is a "variable focus" lens. This region of continual curvature does not result in an unambiguous image of the object in the plane of the receiver. Instead, it results in a diffuse zone with a relatively large cross section, perpendicular to the axis of the reception path. Measurement signals from this diffuse zone may therefore be advantageously used to ensure that sufficient measurement signal intensity is applied to the active surface of the receiver, even when object distances are short. With optical systems with parallaxes between the transmitter and the receiver, a multifocal lens of this type is therefore well-suited for ensuring that adequate signal reaches the receiver, even when distances are short.

In an alternative embodiment of the inventive measuring device, the second region of the multifocal lens could have a constant, e.g., spherical surface curvature.

With the inventive measuring device, the second region of the multifocal lens advantageously surrounds the first region in an annular manner.

In alternative embodiments, the short-range element may have diffractive structures, e.g., a diffraction grating, in particular a holographic diffraction grating, which makes possible—for short object distances—that the returning measurement beam is deflected to the detector surface of the receiver of the measuring device. The short-range element may be designed as a purely diffractive element, as a refractive element, or as a refractive element with an additional diffractive structure.

In an advantageous variant, the lens may be designed as a nearly planar convex lens, so that, primarily, only one lens surface has strong curvature, while the other is designed nearly planar in shape. The diffractive structures are advantageously applied to the nearly planar back side of the lens, using, e.g., the methods that are typical for digital holograms, such as optical-lithographic structuring (which is relevant for glass lenses in particular) and stamping (for lenses made of softer materials, such as plastics).

In an advantageous embodiment of the inventive short-range element, diffusor or beam-splitter hologram structures are used for the structures that are active at short range. They serve to ensure that the originally one focus in the focal plane is divided into several individual focal planes at different positions, and that a focus over a small space is converted to a wider image pattern—specified by the hologram structures—in the focal plane.

In an advantageous embodiment, the diffractive element of a beam-splitting structure is designed so that one of the several focal points in the focal plane of the lens has an angular offset that exactly compensates for the angular displacement that results due to the parallaxes with a bi-axial system for a given distance.

In a further advantageous embodiment, the diffractive structure of the short-range element is designed such that a distinction is made between two regions. To optimize the parallax dependency, a diffusor hologram may be applied, e.g., on the planar side of the lens, within a first field that encloses the central lens region, e.g., in an annular manner. Diffractive structures may be installed within a second region, which is located, e.g., in the central field of the lens, the diffractive structures being used to optically correct lens errors in the front side of the lens, which is, e.g., spherical in design. Using suitable structures of this type, a temperature compensation, e.g., of the refractive index of plastic, may be attained for the second region for the working wavelength of the lens, or e.g., spherical aberrations are advantageously suppressed.

Given that two different types of diffractive structures are realized on the lens in two regions of the short-range element, two goals may be advantageously attained simultaneously: It is possible to improve the imaging properties of the central lens region, which is used for the distant field. In addition, the behavior of the lens may be optimized in terms of the parallax problem.

The short-range element and the receiving lens system may also be made of plastic. The receiving lens system and the short-range element are advantageously formed as one piece, out of plastic, e.g., using injection-molding technology. This makes it possible to realize an imaging lens system for the inventive electro-optical measuring device that compensates for parallax in a simple, cost-favorable manner. An injection-molding tool insert may be manufactured, e.g., using a process that only rotates. It is also possible to inject the plastic part more precisely due to the symmetry, in particular the rotational symmetry, of the short-range element and the imaging lens system. Optionally, diffractive structures of the short-range element may also be formed directly when the combined lens system is created using the injection-molding process.

Further advantages result from the description of an inventive measuring device.

BRIEF DESCRIPTION OF THE DRAWINGS

An exemplary embodiment of an inventive electro-optical measuring device is shown in the drawing. The description, drawing, and the claims contain numerous features in combination. One skilled in the art will also consider the features individually and combine them to form further reasonable combinations.

DETAILED DESCRIPTION OF AN EXEMPLARY EMBODIMENT

Figure 1:
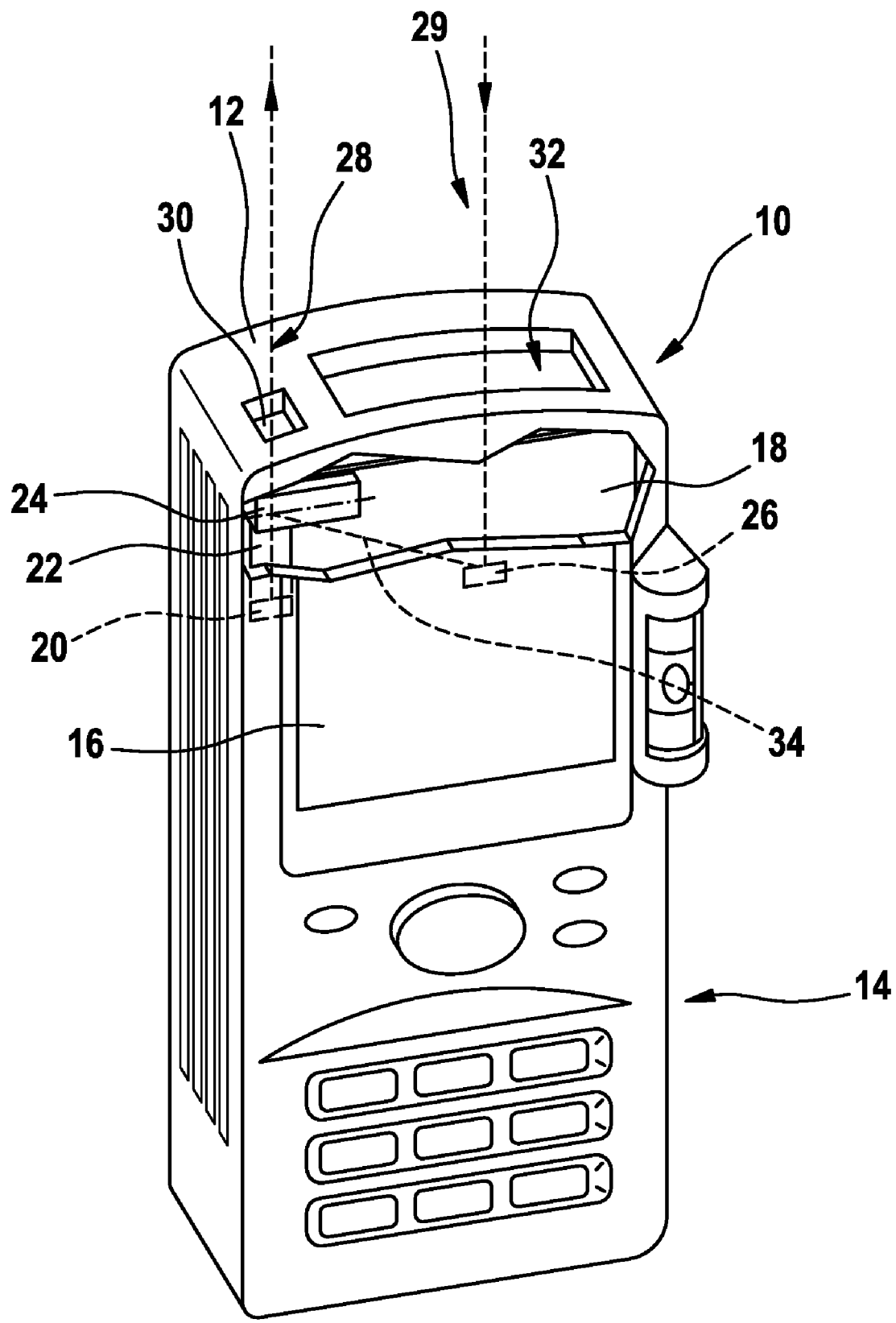
FIG. 1 shows a contactless distance measuring device as an exemplary embodiment of the inventive measuring device, in a perspective overview.

FIG. 1 shows a measuring device designed as a distance-measuring device 10. Distance-measuring device 10 includes a housing 12, and actuating elements 14 for switching distance-measuring device 10 on and off, and for starting and configuring a measuring procedure. A display 16 for depicting information and, in particular, for depicting results measured by the measuring device is also provided in housing 12 of measuring device 10.

The following are located on a carrier element 18 inside housing 12 of measuring device 10: A transmitting unit 20 designed as a laser diode for generating a modulated, optical transmitted measurement signal, a light channel 22, a deflecting unit 24 for deflecting the transmitted measurement signal to a reference path, and a receiver unit 26 designed as a photodiode—in particular as an APD—for receiving a received measurement signal.

Figure 2:
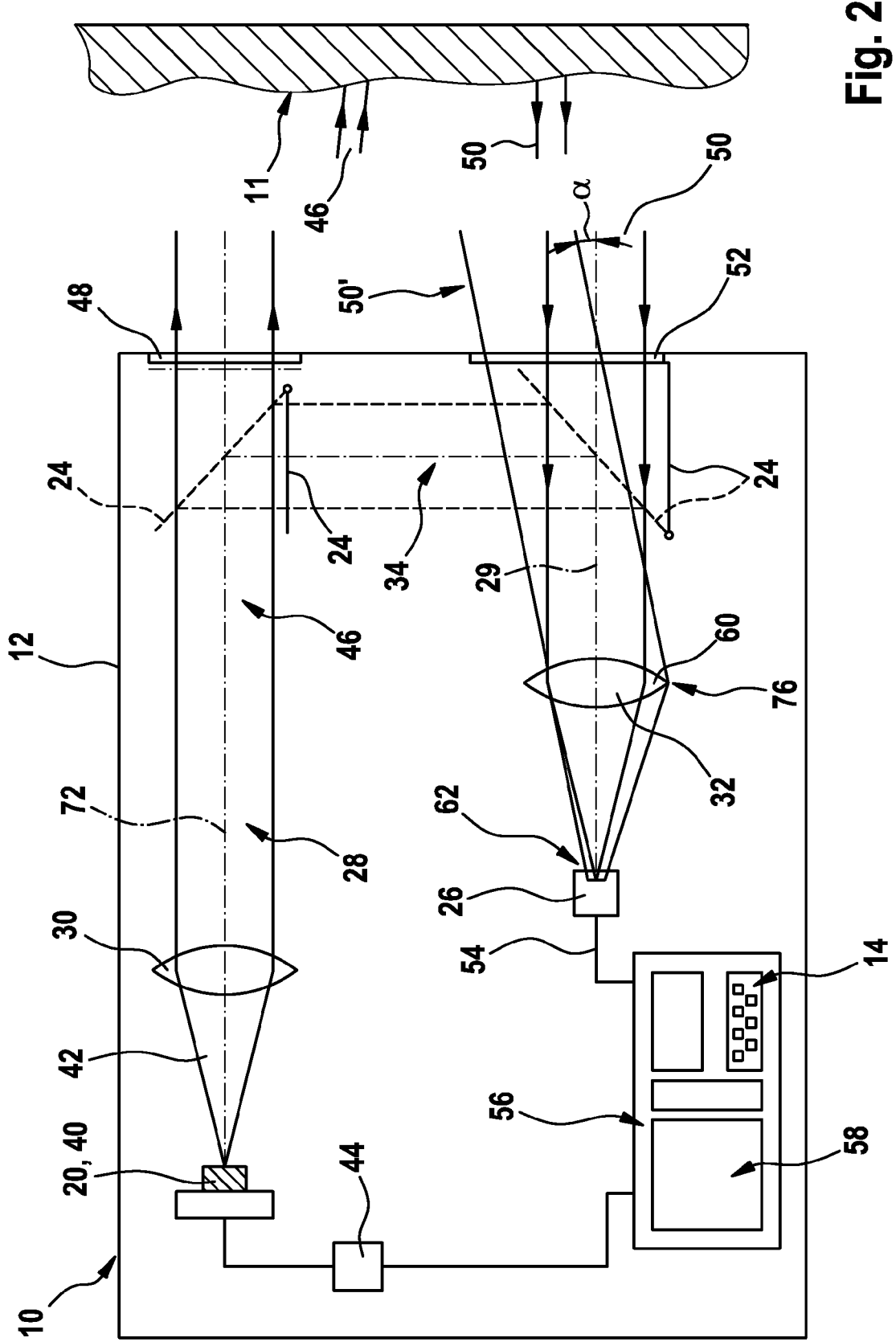
FIG. 2 shows a schematic depiction of the optical design of a distance measuring device according to FIG. 1.

FIG. 2 shows the optical components of the distance measuring device in another schematicized depiction.

To measure a distance between distance-measuring device 10 and a remote object 11, transmitting unit 20 sends out a transmitted measurement signal via a transmission lens system 30 along a path 28 during operation of distance measuring device 10. The transmitted measurement signal, which is reflected by a surface of remote object 11, is received as a received measurement signal by receiver unit 26 via receiving lens system 32. Optical axis 72 of transmission path 28 of the device is separated from optical axis 74 of reception path 29. The measuring device is therefore a bi-axial system.

The light transit time between the transmitter and the receiver may be determined via the phase comparison of the transmitted measurement signal and the received measurement signal, thereby making it possible to determine the distance between measuring device 10 and a remote object 11 based on the known quantity of the speed of light.

A reference measurement is carried out before a distance measurement is performed, in order to equalize transit times, that are independent of the distance and that result, e.g., when the transmitted measurement signal is generated and/or when the received measurement signal is processed. The transmitted measurement signal is deflected by deflection unit 24, and it is directed via a known reference path along a reference path 34 directly to receiver unit 26.

A modulated measurement signal is transmitted along transmission path 28 via transmission unit 20, which includes a light source in the form of a laser diode 40. The transmission unit also includes a control device 44 for controlling and, in particular, modulating laser diode 40. Using transmission lens system 30, which is depicted schematically in FIG. 2 as a simple lens, a parallel beam 46 is generated and transmitted out of measuring device 10 via a window 48 installed in housing 12 of the device.

Modulated measurement signal 46' is reflected on an object 11 to be measured, thereby resulting in a returning beam 50, a portion of which returns to measuring device via a window 52.

The measurement signal traveling along reception path 29 is focussed via receiving lens system 32 onto active surface 62 of a reception unit 26, e.g., a photodiode or a CCD system. Reception unit 26 is connected with an arithmetic and evaluation unit 56 via electrical connection means 54. Arithmetic and evaluation unit 56 ascertains the distance between object 11 and a reference point of measuring device 10 from the phase relationship between output measurement signal 46 and returning measurement signal 50.

The inventive measuring device also includes output means 58, which may be designed, e.g., in the form of a display, and which may display the particular measurement results to a user and provide him with additional information, e.g., the status of the device.

Given short distances between an object 11 to be measured and distance measuring device 10, returning beam 50' enters the device at an angle $\alpha$ with optical axis 74 of reception path 29, as shown in FIG. 2.

In order to bring a measurement signal 50' of this type from the short range to active surface 62 of reception unit 26, thereby making it possible to also measure short distances between the measuring device and an object to be measured, inventive measuring device includes an optical short-range element 60, which is designed rotationally symmetrical with axis 74 of reception path 29, and which is located as a single piece and concentrically with receiving lens system 32 in the exemplary embodiment shown in FIG. 2. Due to short-range element 60, the focussing of returning beam 50 that results for large object distances results takes place, as does a diffuse illumination of active surface 62 of reception element 26 due to beams 50' that enter device 10 at an angle to optical axis 74 of reception path 29.

Figure 3:
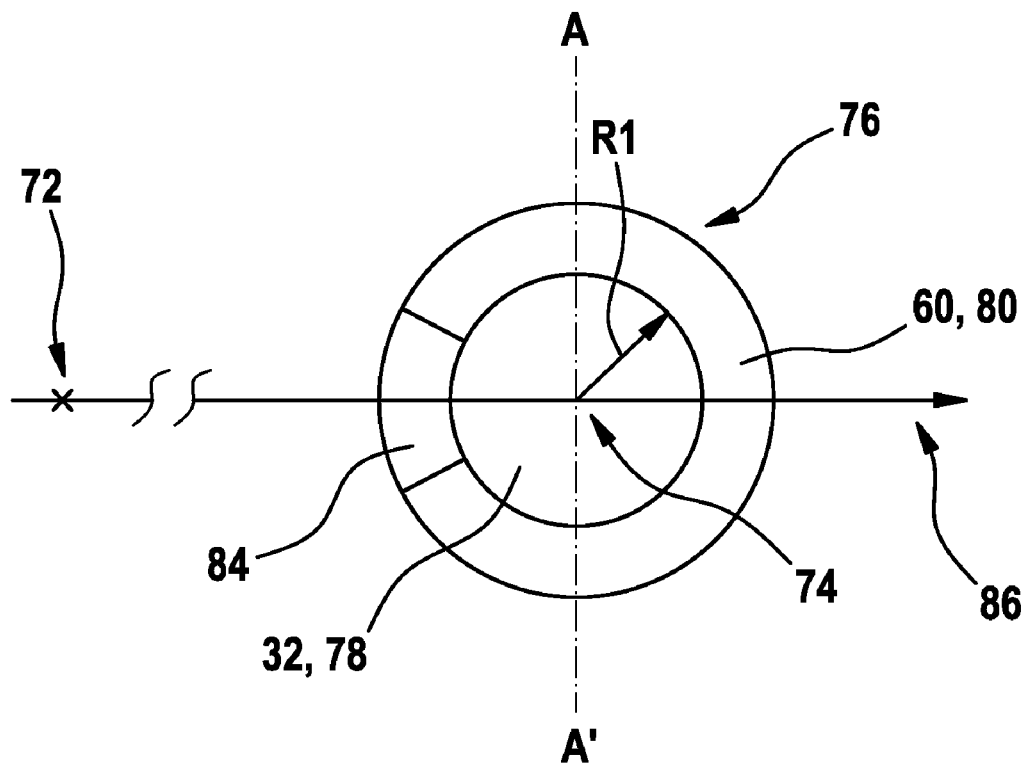
FIG. 3 shows an exemplary embodiment of an inventive short-range element, including the associated imaging lens system, in a schematic depiction.

FIG. 3 shows an exemplary embodiment of an inventive short-range element for parallax compensation of bi-axial distance measuring devices. In the exemplary embodiment shown in FIG. 3, short-range element 60 is designed concentrically with receiving lens system 32. In this exemplary embodiment in particular, short-range element 60 is designed as one piece with the receiving lens system, and is made, e.g., of plastic.

Receiving lens system 32 is advantageously optimized as an aspherical lens, thereby resulting in the smallest possible spot on the active surface of receiving unit 26 for a beam 50 that that arrives, optically, from infinity. An aspherical lens of this type may be described using the following equation:

$$d = \frac{R^2}{R_0 * \left(1 + \sqrt{1 - e * \frac{R^2}{R_0}}\right)}$$

Figure 4:
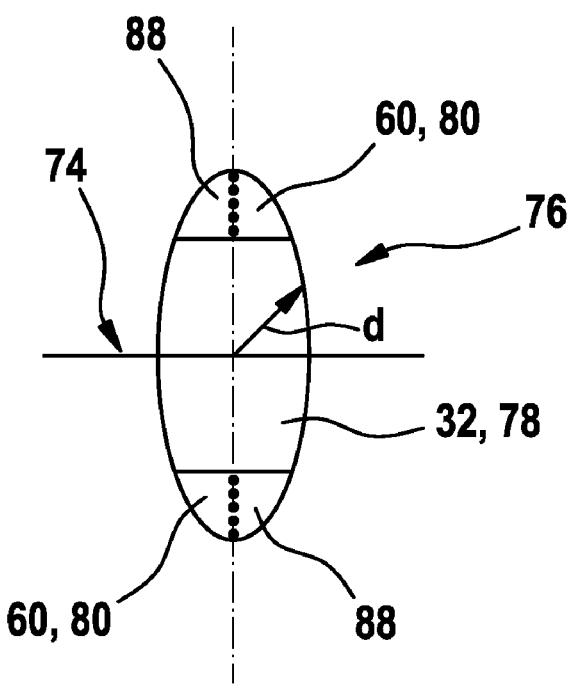
FIG. 4 shows a cross section of the optical element according to FIG. 3 along a plane AA'.

The letter "d" represents the "rise", i.e., the length of a path between the symmetry axis of the lens and the lens surface, as illustrated in FIG. 4, which is a cross section through axis AA' in FIG. 3.

$R_0$ represents a radius constant, e is the aspherical correction of the lens curvature, and R is the variable radius.

With the inventive measuring device, imaging lens system 32, which is optimized for infinity, and the short-range element are combined in a single element 76, thereby resulting in a circumferentially symmetrical multifocal lens 76 in the exemplary embodiment. Multifocal lens 76 is designed in particular as a "variable focus" lens.

With a "variable focus" lens, radius constant $R_0$ of the aspherical lens is replaced with a variable starting at a certain transition radius $R_1$.

The following therefore results for the inventive multifocal lens:

$$R_0 = a_r * R^2 + b_r * R + c_r$$

with $a_r$: Variable $b_r = -2 * a_r * R_L$ $c_r = R_0 + a_r * R_L^2$

A multifocal lens of this type therefore has a first central region 78, which has an aspherical surface curvature, and includes, in particular, an aspherical lens correction. This multifocal lens also includes a second region 80, which has a continually changing surface curvature and, therefore, a focal distance that varies accordingly.

In the exemplary embodiment in FIGS. 3 and 4, the first, aspherically corrected region 78 is in a central position, and second region 80 of multifocal lens 76—which serves as short-range element 60—encloses the first, aspherical region in an annular manner.

As shown in FIG. 4, a lens 76 of this type may have the curvatures on both passage sides, or on only one side. Inventive lens 76 may therefore also be designed approximately as a planar convex lens. It may be advantageous for plastic lenses, in particular, to form the nearly planar side of the lens with a slight, fixed curvature. The effect of a multifocal lens 76 of this type, in particular the effect of rotationally symmetric short-range element 60 will be illustrated below with reference to the schematic illustration in FIGS. 5 and 6.

Figure 5:
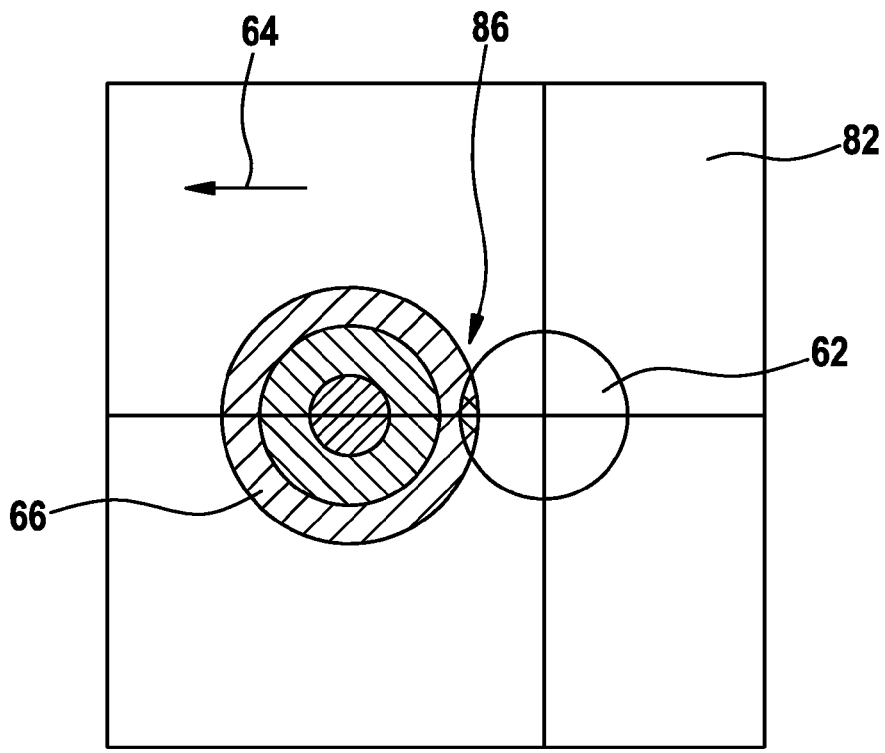
FIG. 5 shows the measurement signal distribution on the receiver surface with short object distances when a standard lens is used to focus the measurement signal on the receiver.

FIG. 5 is a schematic depiction of the intensity distribution in receiver plane 82 for an optical system with parallaxes, when a standard lens is used. For short object distances, a very small amount of light strikes active detector surface 62. Since, given a decreasing object distance, the measurement signal strikes the imaging lens system at an increasingly greater slant, this results in the focussed measurement signal spot wandering away from detector surface 62—as shown in FIG. 5—in the direction of arrow 64. Due to the short object distance, the measurement beam is not completely focussed in detector plane 82. The intensity distribution of the measurement beam in the detector plane is indicated in FIG. 5 with differently shaded regions of measurement beam 66. The measurement signal is detected by receiver unit 26 only in the overlap region 86 of intensity distribution 66 with active surface 62 of receiver unit 26.

Figure 6:
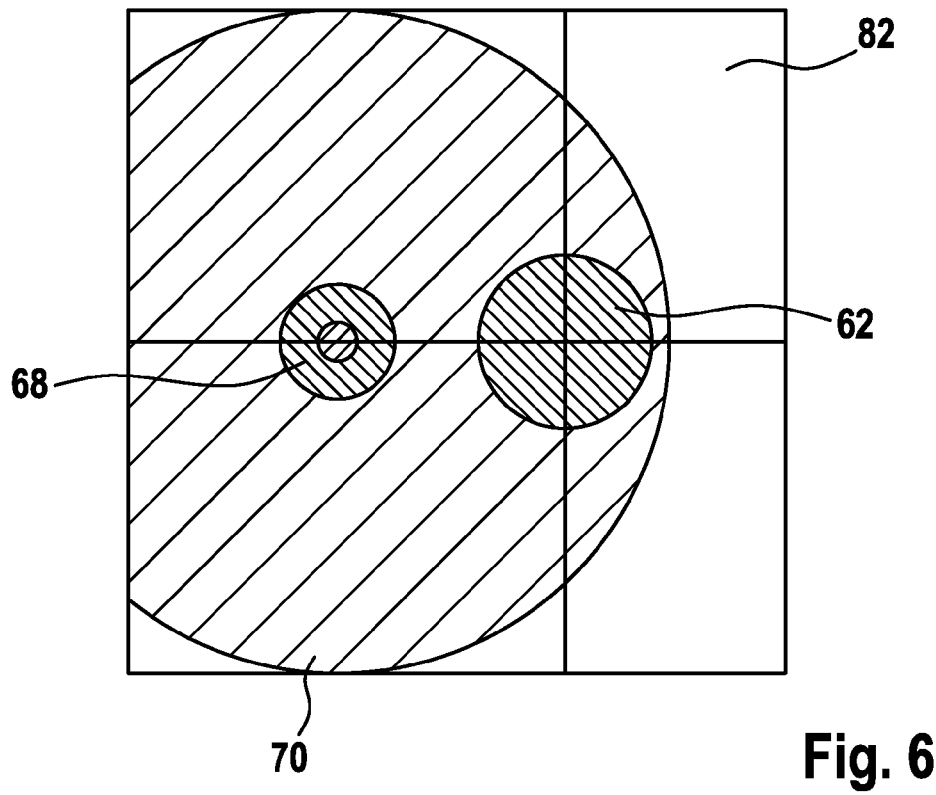
FIG. 6 shows a measurement signal distribution in the receiver plane of an optical system with parallaxes when the inventive short-range element is used.

FIG. 6 shows the intensity distribution when inventive multifocal lens 78 is used, and otherwise with the same preconditions as in FIG. 5.

Due to the aspherically corrected receiving lens system, a relatively well measurement signal beam 68 results in the receiving plane of reception element 26. This highly focussed measurement signal is located outside of active surface 62 of receiving unit 26, however. Short-range element 60, which is designed concentrically with aspherically corrected receiving lens system 32, and which has a continually changing surface curvature, results in a relatively widespread, diffuse zone 70, which also overlaps active surface 62 of reception element 26. As a result, a sufficient quantity of light strikes active surface 62 of reception element 26, even when object distances are short. Inventive short-range element 60, combined with receiving lens system 32, therefore results in a well-focussed measurement beam 68, which is surrounded by a diffuse zone 70.

Advantageously, inventive short-range element 60 and receiving lens system 32 may be designed as one piece, and are made of plastic in particular. Multifocal lens 78 may be formed, e.g., using an injection-molding process. The injection-molding may be carried out more precisely due to the symmetry of the element, in particular due to its rotational and circumferential symmetry, than was possible with previous short-range elements. The injection-molding tool insert for an optical element of this type may be easily manufactured with high accuracy using a purely rotating process.

It should be noted that only one segmented short-range element would be required for parallax compensation, as indicated in FIG. 3 with reference numeral 84. Sub-element 84 is located symmetrical with connection axis 86 of the two optical axes 72 and 74 of the bi-axial optical system. The inventive rotationally symmetric design of short-range element 60 simplifies the manufacture of this element, however, so the fact that parts of the lens surface—in particular, parts of the surface of the short-range element—are not used is accepted.

If it should become necessary, these unused parts of the short-range element could be hidden or covered with a mask, to suppress undesired components of scattered light.

With optical systems with parallaxes between the receiver and transmitter, e.g., with electro-optical distance measuring devices, the inventive multifocal element ensures that adequate signal is deflected to the active surface of the receiving unit, even when the distances between the measuring device and an object to be measured are short.

The inventive measuring device is not limited to the exemplary embodiment depicted in the figures. This exemplary embodiment serves merely to illustrate one possible exemplary embodiment of the present invention.

The inventive measuring device is not limited to the use of a refractive short-range element. The short-range element may also be designed, e.g., as a diffractive element, or it may be manufactured as a combination of refractive and diffractive elements. It is also possible, in particular, to design an additional diffractive structure on or in a refractive short-range element.

In addition to the refractive structures of lens 76, the lens or, e.g., only the inventive short-range element may also include diffractive structures 88, as indicated schematically in FIG. 4 with a dashed line 88 in the region of short-range element 60 or 80.

In an advantageous embodiment, a diffractive structure of the short-range element of this type is designed such that a distinction is made between two regions. To optimize the parallax dependency, a diffusor hologram may be applied, e.g., on the planar side of the lens, within a first field that encloses the central lens region, e.g., in an annular manner. Diffractive structures may be installed within a second region, which is located, e.g., in the central field of the lens, the diffractive structures being used to optically correct lens errors in the front side of the lens, which is, e.g., spherical in design. Using suitable structures of this type, a temperature compensation, e.g., of the refractive index of plastic may be attained for the second region, for the working wavelength of the lens, or e.g., spherical aberrations are advantageously suppressed.

Given that two different types of diffractive structures are realized on the lens in two regions of the short-range element, two goals may be advantageously attained simultaneously: It is possible to improve the imaging properties of the central lens region, which is used for the distant field. In addition, the behavior of the lens may be optimized in terms of the parallax problem.

In particular, the inventive measuring device is not limited to the use of an electro-optical distance measuring device, such as a laser rangefinder. The inventive short-range element may also be used, e.g., with optical systems based on the triangulation principle, or in intrusion detectors.

What is claimed is:

1. An electro-optical measuring device in the form of a hand-held device (10) for contactless distance measurement, comprising:
    an optical transmission path (28) having a first optical axis (72) and including at least one optical transmitter (20) for transmitting a measurement signal;
    a reception path (29) with a second optical axis (74) that is separated from the first optical axis (72);
    at least one receiving lens system (32) for bundling a measurement signal in the direction of a receiver (26); and
    an optical short-range element (60) for parallax compensation, wherein said short-range element (60) is not identical with the at least one receiving lens system (32),
    wherein the short-range element (60) is designed rotationally symmetrical to the second optical axis (74).

2. The measuring device as recited in claim 1, wherein the short-range element (60) is designed concentric with the at least one receiving lens system (32).

3. The measuring device as recited in claim 1, wherein the short-range element (60) is designed as one piece with the at least one receiving lens system (32).

4. The measuring device as recited in claim 1, wherein the short-range element (60) and the at least one receiving lens system (32) form a circumferentially symmetrical multifocal lens (76).

5. The measuring device as recited in claim 4, wherein the multifocal lens (76) includes a first region (78) that has an aspherical surface curvature.

6. The measuring device as recited in claim 4, wherein the multifocal lens (76) includes a second region (80) that has a continually changing surface curvature.

7. The measuring device as recited in claim 4, wherein the multifocal lens (76) includes a second region (80) that has a constant surface curvature.

8. The measuring device as recited in claim 5, wherein the second region (80) encloses the first region (78) in an annular manner.

9. The measuring device as recited in claim 1, wherein the short-range element (60) has a diffractive structure (88).

10. The measuring device as recited in claim 3, wherein the at least one receiving lens system (32) with the short-range element (60) are made of plastic.

11. The measuring device as recited in claim 3, wherein the at least one receiving lens system (32) are formed, together with the short-range element (60), using injection-molding technology.

12. The measuring device as recited in claim 1, wherein the measuring device is a laser rangefinder (10).

13. A multifocal lens for a bi-axial, optical measuring device, the optical measuring device comprising a hand-held device (10) for contactless distance measurement with an optical transmission path (28) that has a first optical axis (72) and includes at least one optical transmitter (20) for transmitting a measurement signal, and with a reception path (29) with a second optical axis (74) that is separated from the first optical axis (72), with at least one receiving lens system (32) for bundling a measurement signal in the direction of a receiver (26), and with an optical short-range element (60) for parallax compensation,
    wherein the short-range element (60) is designed rotationally symmetrical to the second optical axis (74),
    wherein the short-range element (60) and the at least one receiving lens system (32) form a circumferentially symmetrical multifocal lens (76), and
    wherein the lens (76) has additional diffractive structures (88).

14. The multifocal lens as recited in claim 13, wherein the diffractive structures (88) are designed as hologram structures in or on the lens (76).

15. The multifocal lens as recited in claim 13, wherein the diffractive structures (88) are designed as diffusor or beam-splitting structures.

16. An electro-optical measuring device in the form of a hand-held device (10) for contactless distance measurement, comprising:
    an optical transmission path (28) having a first optical axis (72) and including at least one optical transmitter (20) for transmitting a measurement signal;
    a reception path (29) with a second optical axis (74) that is separated from the first optical axis (72);
    at least one receiving lens system (32) for bundling a measurement signal in the direction of a receiver (26); and
    an optical short-range element (60) for parallax compensation,
    wherein the short-range element (60) is designed rotationally symmetrical to the second optical axis (74) and wherein the short-range element (60) is designed concentric with the at least one receiving lens system (32).

* * * * *